United States Patent [19]
Martin

[11] Patent Number: 5,859,149
[45] Date of Patent: Jan. 12, 1999

[54] PRODUCTION OF SOLID POLYASPARTATE SALT

[75] Inventor: David A. Martin, Ballwin, Mo.

[73] Assignee: Solutia Inc., St. Louis, Mo.

[21] Appl. No.: 796,642

[22] Filed: Feb. 7, 1997

[51] Int. Cl.⁶ .................................................. C08F 283/04
[52] U.S. Cl. ......................... 525/420; 525/418; 525/419; 528/328; 528/363
[58] Field of Search .................................. 528/328, 363; 525/418, 419, 420

[56] References Cited

U.S. PATENT DOCUMENTS

| | | | |
|---|---|---|---|
| 5,288,783 | 2/1994 | Wood | 528/363 |
| 5,521,257 | 5/1996 | Ross | 525/420 |
| 5,552,517 | 9/1996 | Martin | 528/363 |

*Primary Examiner*—Duc Truong
*Attorney, Agent, or Firm*—Fitzpatrick, Cella, Harper & Scinto

[57] ABSTRACT

A process for preparing polyaspartic acid salt by bringing solid polysuccinimide and solid alkali metal hydroxide or alkaline earth metal hydroxide into reactive contact to form solid polyaspartate metal salt. The salt is granular and free-flowing.

15 Claims, No Drawings

PRODUCTION OF SOLID POLYASPARTATE SALT

BACKGROUND OF THE INVENTION

This invention relates to polyaspartic acid salt and more particularly to a process to form such salt.

Polyaspartic acid (PAA) salt is prepared by thermally polycondensing L-aspartic acid, optionally in the presence of acid catalyst, to form polysuccinimide (PSI) (sometimes interchangeably called anhydropolyaspartic acid or polyanhydroaspartic acid) and then reacting the PSI with aqueous alkali metal hydroxide to form a solution of PAA metal salt. This salt solution is industrially important for many uses such as a lubricant in metalworking applications or a corrosion inhibitor as disclosed in U.S. Pat. Nos. 4,971,724 and 5,401,428 to Kalota et al. The cost to ship salt to distant users could be significantly reduced if the water of solution was absent. Unfortunately, as the salt solution is dehydrated, a thick, viscous, gummy mass forms having the consistency of glue which is quite difficult to handle. Therefore, to the best of applicant's knowledge, heretofore such PAA polymer salt has been used in aqueous solution.

SUMMARY OF THE INVENTION

Now improvements have been made in preparing PAA salts which overcome shortcomings in the prior art.

Accordingly, a principal object of this invention is to provide a process for preparing PAA salt in solid form.

Another object is to provide PAA salt as a solid, granular, free-flowing material.

Other objects of this invention will in part be obvious and will in part appear from the following description and claims.

These and other object are accomplished by a process for preparing polyaspartate salt which comprises reacting polysuccinimide with solid alkali or alkaline earth metal base to form solid polyaspartate salt. The base is preferably alkali (e.g. sodium or potassium) metal hydroxide and the reaction is preferably carried out at substantially room temperature (about 23° C.) in a non-polar organic medium in which the PSI had been formed, such as disclosed in U.S. Pat. No. 5,552,517 to Martin of which the detailed description (col. 3, line 35 et seq) is incorporated herein by reference.

DETAILED DESCRIPTION

The inventive process is the solid-solid reaction of solid PSI with solid inorganic hydroxide in the form of alkali or alkaline earth metal base to form solid polyaspartate salt. Alkali metal encompasses lithium, sodium, potassium and cesium. Alkaline earth metals include magnesium and calcium. Non-aqueous, solid, neat sodium hydroxide or potassium hydroxide (or mixtures thereof) in nearly anhydrous state (no more than 15 wt. % water) are preferred. Water in such nearly anhydrous solid is typically only that absorbed from the atmosphere.

The inorganic metal hydroxide compound is present in the stoichiometric amount required to open the polymer rings of the PSI precursor. It is in pellet form or a fine powder prepared by milling pellets to-increase surface area. Too rapid addition of such hydroxide compound to the reaction can cause some PSI precursor to depolymerize to shorter chain polymer and to the L-aspartic acid monomer. Using sodium hydroxide as the base, the hydrolysis reaction is depicted as follows:

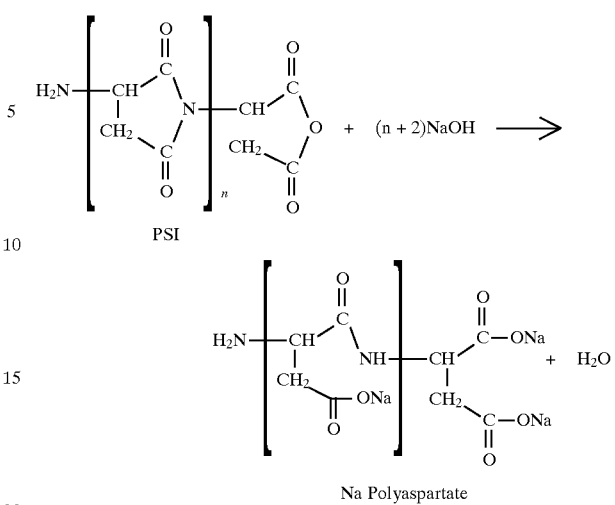

In this reaction n is an integer having a value of about 30 to about 1000.

The solid-solid base hydrolysis reaction is carried out in any of various reaction environments typically used to form PSI—i.e. after PSI is formed, the hydrolysis reaction is then conducted in that environment. For example, a continuous tray dryer process can be used wherein the aspartic acid is introduced to the top level of trays which cyclically travel horizontally to deliver reacting material to the next lower tray level. Residence time is controlled by the number of tray levels and the tray rotational speed. Energy is input to the system by circulating heated gas such as air through the dryer wherein the temperature is usually about 200° C. to about 350° C. A typical residence time in such a system is about 1.5 to about 3 hours. Such a tray dryer apparatus is commercially available from the Wyssmont Company Incorporated, Fort Lee, N.J. Another is commercially produced by Krauss Maffe of Florence, Ky. In the latter version, heated trays are stationary and the reactant which is directly heated by the trays is moved across each try by axially rotating plows or shovels. The reactant falls from one tray level to the next at the internal or external edge of the tray.

In a tray dryer process the solid-solid base hydrolysis reaction is carried out by adding base as a fine powder onto the tray where polymerization has been determined to be complete. Cooling, for example by circulating chilled air, should be employed on trays where hydrolysis is occurring.

Other reactors for producing PSI include the List reactor commercially available for Aerni, A.G. August, Switzerland and the Littleford Reactor such as the model FM 130 Laboratory Mixer and larger production models available from Littleford Bros. Inc., Florence, KY.

The Littleford mixer provides sufficient agitation of reactants to produce a fluid bed condition and may be equipped with a chopper to break lumps or clumps of particles and provide additional shear force to the fluid bed. Agitation is sufficient to maintain particles in a substantially free-flowing state throughout the time of reaction. In a Littleford mixer the heated bed is maintained at about 180° C. to about 250° C. for a time sufficient to polymerize the aspartic acid. The mixer is desirably equipped to provide purge gas such as carbon dioxide through the rector to catalyze the condensation which reduces the time to completely polymerize the aspartic acid. In this type of process, solid-solid base hydrolysis is carried out by cooling the reaction mass to less than 50° C. and introducing the base in powder or more typically pellet form using the chopping action to break the pellets into fine particles.

U.S. Pat. No. 5,552,517 to Martin discloses preparing PSI at elevated temperature in a high boiling inert organic reaction medium such as dodecane. The organic medium and aspartic acid are well mixed, at about 180° C. for about 90–100 min to form PSI. This is a preferred system because of its good heat transfer and mixing and ease of carrying out the solid-solid hydrolysis reaction. After the condensation reaction is complete, the solid inorganic hydroxide compound is directly added in situ to the slurry of PSI in the organic medium and the PSI and base allowed to react in the solid state with intense agitation until the salt-forming hydrolysis reaction is complete. Solid PAA salt is then separated from the organic medium by any conventional means, such as filtration or centrifuging, and residual organic medium removed by drying usually at elevated temperature. Alternatively, one or a combination of the tray dryer or fluidized bed processes referred to above can be used to form PSI and then the organic medium process of the U.S. Pat. No. '428 used for the salt forming solid-solid reaction of the invention. To do this, the PSI precursor from such other process is charged to the inert organic medium and then the salt-forming reaction implemented.

The salt-forming reaction is carried out at a temperature sufficient to permit the solid—solid hydrolysis to occur in an industrially reasonable time. This is preferably from or about room (i.e. 20°–25° C.) to or about 70° C. At temperatures greater than 75° C., the PSI precursor undesirably starts to degrade. Reaction below room temperature tends to be too long. Vigorous agitation during the reaction promotes intimate reactive contact between PSI and solid hydroxide compound.

The PAA salt of the solid-solid base-hydrolyzed invention is granular and free-flowing. It is very hygroscopic on exposure to air and readily fully soluble in water. The salt may be further converted to polyaspartic acid by reaction with a strong acid whereby the metal cation in the repeating unit of the polymer is replaced with hydrogen while forming metal salt with the acid anion. The polymer salt or acid has many industrial uses such as a biodegradable lubricant in metal working as disclosed in the U.S. Pat. No. '428 Pat. or as corrosion inhibitor for ferrous metals as disclosed in the U.S. Pat. No. '724 Pat. The solid salt is conveniently shipped from a manufacturing site to a use location at reduced cost in the absence of water and, optionally, the aqueous solution prepared locally. Alternatively, dry solid PAA acid or salt may be further reacted with other component(s) such as crosslinker to form a PAA derivative having further potential uses.

The invention is further described in the following Examples which are not intended to limit or restrict the invention. Unless otherwise indicated, quantities and percentages are expressed in weight.

EXAMPLE 1

A) Preparation of Polysuccinimide (PSI)

Into a 1000 ml glass reactor equipped with stirrer, heating mantle, thermometer and condenser is charged 471.6 g of dodecane and 248.9 g of L-aspartic acid. The acid and alkane slurry is mixed well and heated to about 175° C. 125.8 g total of 29.6% phosphoric acid is added semi-continuously to the agitated reactor contents as an aqueous solution while maintaining the reacting mixture via the heating mantle at about 175° C. The solids in the reactor are well dispersed by the agitation throughout the organic reaction medium during the thermal polycondensation reaction of L-aspartic acid to polysuccinimide. Water vapor formed during the reaction is condensed and collected continuously. The reaction is discontinued (catalyst charge stopped) when condensing water accumulation stops. Total reaction time at about 175° C. is about 6 hrs. The reactor contents is cooled to about 20° C. A sample (28.2% polymer solids) has a molecular weight of 10,444 Daltons — an average of 2 measurements determined by size exclusion chromatography. Conversion based on $H_2O$ recovered is 93.6%.

B) In Situ Hydrolysis of PSI Using Anhydrous NaOH

After formation of the PSI, the reactor contents of A) above is filtered and 58.2 g of PSI and 205.53 g of dodecane recharged back into the reactor. 21 gm of anhydrous, laboratory grade sodium hydroxide is milled into fine powder and added to the dodecane—PSI slurry with agitation over about 7 hours at 20°–24° C. The reactor slurry is filtered and dried in an oven providing solid, substantially white, granular, free-flowing sodium polyaspartate. Unreacted L-aspartic acid is measured at 1.42%. Molecular weight of the base-hydrolyzed product is measured at 9,914 Daltons which is not considered a significant deviation from the PSI molecular weight in A) above. Complete dissolution of the solids in water demonstrates successful hydrolysis.

EXAMPLE 2

This examines the difference between the PAA salt product of the process of this invention and PAA salt obtained by dehydrating a water solution of PAA salt formed by liquid base hydrolysis of PSI using sodium hydroxide. 95.32 g of PSI prepared in a Wyssmont rotary tray dryer is hydrolyzed using 45.3% aqueous sodium hydroxide. Additional water is added to form a 20% sodium polyaspartate (NaPAA) concentrate. Aliquots are taken from this concentrate and dehydrated to various endpoints and the viscosity of the resulting solution measured. To perform this dehydration, the solution in a glass beaker is placed in a vacuum oven at 80° C. Results of measuring viscosity as a function of concentration are as follows:

| Concentration % $H_2O$ in sample | Viscosity-80° C. Cp | Viscosity-25° C. Cp |
|---|---|---|
| 30 | 8,029,861 | 2E + 13* |
| 35 | 113,074 | 2.6E + 09 |
| 40 | 7,108 | 7,820,038 |
| 45 | 1,066 | 145,924 |
| 50 | 275 | 8,459 |
| 55 | 101 | 1,029 |
| 60 | 47 | 207 |
| 65 | 26 | 60 |
| 70 | 16 | 22 |

*i.e. $2 \times 10^{13}$

The above data shows a huge viscosity at 70% salt concentration. Above 70% the highly viscous solution could not be conveniently removed from the flask for further handling. In another experiment, total dryness is achieved providing a glass-like solid which is very sticky in texture. Attempts to mill this in a Waring blender are unsuccessful because of this stickiness. Dry, free flowing NaPAA solid is not obtained which is in contrast with the polyaspartate salt of the invention further examined below.

The sodium polyaspartate reaction product of Example 1 present as a slurry in dodecane is centrifuged to remove the organic reaction medium. The solid polyaspartate salt is dried in the vacuum oven noted above at 80° C. overnight to remove residual organic $C_{12}$. The dried product is tan in color, granular and free flowing in that it readily pours out of a jar without bridging or sticking to the sidewalls. The reason for this different form of anhydrous salt is the absence of water in that an aqueous solution was never formed. Removing the salt from solution is not required in this invention.

The preceding description is for illustration and should not be taken as limiting. Various modifications and alterations will be readily suggested to persons skilled in the art. It is intended, therefore, that the foregoing be considered as exemplary only and that the scope of the invention be ascertained from the following claims.

I claim:

1. A process for preparing polyaspartate salt which comprises reacting polysuccinimide with solid alkali or alkaline earth metal base to form solid polyaspartate salt.

2. A process for preparing polyaspartate salt which comprises bringing solid polysuccinimide and solid alkali metal hydroxide into reactive contact to form solid polyaspartate metal salt.

3. The process of claim 1 wherein the polysuccinimide is suspended in an organic reaction medium in which it is formed.

4. The process of claim 3 wherein the organic medium and polysuccinimide are at substantially room temperature during the reaction.

5. The process of any of claims 1, 3 or 4 wherein the base is alkali metal.

6. The process of claim 5 wherein the alkali metal is sodium.

7. The process of claim 5 wherein the alkali metal is potassium.

8. In a process forming polyaspartate salt by base hydrolysis of polysuccinimide, the improvement wherein the hydrolysis is conducted in the solid state.

9. The process of claim 8 wherein solid alkali metal hydroxide is used in the hydrolysis.

10. A process for preparing granular, free-flowing polyaspartate salt which comprises:

a) thermally condensing L-aspartic acid dispersed in a stirred, liquid organic reaction medium to form a slurry of solid polysuccinimide;

b) reacting the polysuccinimide in situ with solid alkali metal hydroxide to form solid polyaspartate salt dispersed in the organic medium;

c) separating the salt from the organic medium; and d) drying the separated salt to form granular, free-flowing polyaspartate salt.

11. A solid polyaspartate salt comprising a free-flowing granular mass, wherein said polyaspartate salt is formed nonaqueously.

12. The salt of claim 11 as sodium polyaspartate.

13. The salt of claim 11 as potassium polyaspartate.

14. Solid polyaspartate salt comprising the reaction product of polysuccinimide with solid alkali or alkaline earth metal base.

15. The polyaspartate salt product of the process of claims 1 or 10.

\* \* \* \* \*